Feb. 18, 1936.  O. W. HAHN  2,031,309
VALVE
Filed Nov. 27, 1933
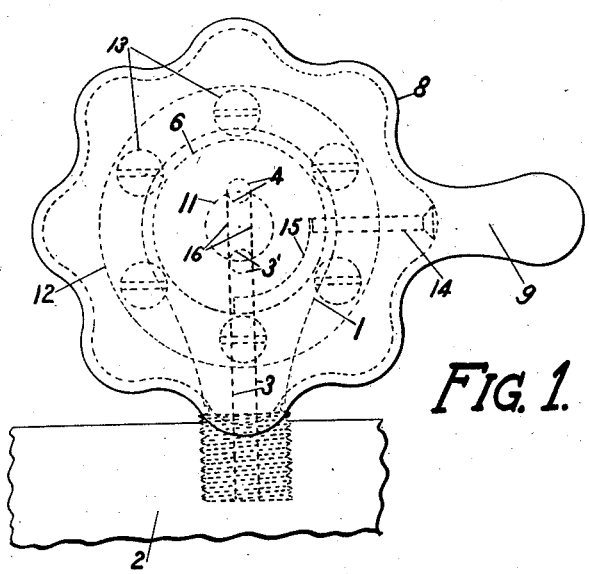
FIG. 1.
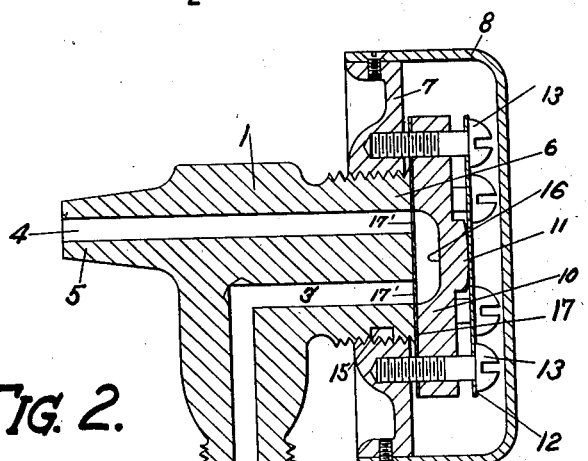
FIG. 2.
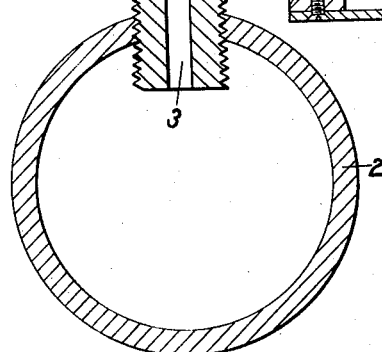
INVENTOR.
Otto W. Hahn
BY
ATTORNEYS.

Patented Feb. 18, 1936

2,031,309

UNITED STATES PATENT OFFICE 2,031,309

VALVE

Otto W. Hahn, San Francisco, Calif.

Application November 27, 1933, Serial No. 699,911

18 Claims. (Cl. 251—84)

This invention relates to valves for any fluid, though particularly as used for gases such as natural gas of whch the lighter constituents such as propane are difficult to seal off perfectly with ordinary valve construction unless tightened up to such an extent that operation becomes difficult.

The object of the invention is to provide a simple and easily operated valve for the purposes outlined above. Other objects and advantages will appear in the following description and accompanying drawing.

In the drawing Fig. 1 is a front view of one form of my improved valve (shown greatly enlarged) applied to a gas range.

Fig. 2 is a central sectional view of the valve.

In further detail the valve comprises a body 1 screwed into a gas supply pipe 2 such as runs along the front of a gas range. The valve is provided with an inlet port 3 and an outlet port 4 formed in a nozzle 5 which is adapted to direct the stream of gas into the usual burner chamber while drawing in with it the necessary air for combustion as is common in all gas stoves. The inlet port is diverted at right angles at 3' so as to lie parallel for a distance with the outlet port and both ports emerge from the valve body at the nicely faced off or ground flat end 6 of a threaded boss on the body directly opposite the outlet port 4. Srewed onto this threaded boss is a hub or disk 7 to the edge of which is secured a thin shell or turning wheel 8 from one side of which preferably extends an operating handle 9 or rather radial pointer to show if any of the valves of a row are turned on or off.

Within shell 8 is a rigid round metal block 10 finished flat on its inner surface and formed with a raised button 11 on its outer surface and against which button lies a thin disk spring 12 held in position by screws 13 around its edge passing through block 10 and threaded into the hub 7 all in a manner so that a tension may be put upon the spring disk to resiliently force the block 10 toward the flat end of the boss 6 yet permit it to be turned with the wheel 8 as the same is turned. Also to be observed is that in turning a fractional turn to the right the threaded engagement of hub 7 on the threaded boss will draw the hub 7 slightly to the left and thus induce a greater tension on the spring disk, but the amount of revolution of handwheel 8 is limited by a stop screw 14 with its end lying within a segment slot 15 formed on the outer diameter of the boss 6.

Block 10 is formed with a cross-over port 16 adapted, when revolved to the position shown in the drawings, to connect the two outer ends of ports 4 and 3' so that gas or any fluid may freely pass from inlet 3 to outlet 4, while positioned between block 10 and the end of boss 6 is a very thin flexible disk 17 preferably of resilient metal such as bronze and which has a pair of apertures formed in it, 17', exactly coinciding with ports 3' and 4 when the valve is in open position as shown in the drawing. This flexible disk 17 is also apertured around its edge for screws 13 so as to be kept with its gas ports 17' in register with the opposite ends of cross-over port 16 of the block.

With a construction as described, a valve is provided which works smoothly and easily at all times, yet is more gas-tight than any other construction with which I am familiar which operates anywhere near so easily. The tightness of the valve I feel to be due to the thin flexible metal disk 17 lying between the flat rigid revolvable valve surfaces as it seems to divide the minute clearances, which must theoretically exist regardless of workmanship, so that in effect they are but half what they would be if both rigid valve surfaces came together.

The disk spring 17 may be given any desired tension by means of the screws 13, and in very large valves slight lubricant holding indentures may be provided on the flat end of the boss, but as this is common and well understood on moving bearing surfaces it has not been shown in the drawing as tending to confuse the same.

Attention is called to the fact that while I show an angle valve provided with my improved features of construction, the main feature of the invention consisting of the flexible metal disk positioned between the rigid flat valve surfaces, may be applied to various forms of valves, also that in some instances the disk 17 may not necessarily be of metal.

I therefore claim:—

1. A valve provided with a faced surface pierced by spaced ports, a faced block movably positioned adjacent said faced surface provided with a cross port arranged to be aligned over said spaced ports when the block is moved, means for resiliently urging the block in the direction of said faced surface, and a thin flat flexible plate of hard resilient metal positioned between the finished surfaces of said block and valve apertured to match said spaced ports.

2. A valve provided with a faced surface pierced by spaced ports, a faced block movably positioned adjacent said faced surface provided with a cross port arranged to be aligned over said spaced ports when the block is moved, means for resiliently urging the block in the direction of said faced surface, and a thin flat flexible plate of hard resilient metal positioned between the finished surfaces of said block and valve apertured to match said spaced ports, and means insuring movement of said block and flexible plate as a unit.

3. A valve provided with a faced surface pierced by spaced ports, a faced block revolvably positioned adjacent said faced surface provided with a cross port arranged to be aligned over said spaced ports when the block is turned, means for resiliently urging the block in the direction of said faced surface, and a thin flat flexible metal plate positioned between the finished surfaces of said block and valve apertured to match said spaced ports, said means resiliently urging the block in the direction of said faced surface comprising a sheet metal spring overlying the block and forced thereagainst by screws at the edge of the spring.

4. A valve provided with a surface pierced by spaced ports, a faced block revolvably positioned adjacent said faced surface provided with a cross port arranged to be aligned over said spaced ports when the block is turned, means for resiliently urging the block in direction of said faced surface, and a thin flexible plate positioned between the finished surfaces of said block and valve apertured to match said spaced ports, said means resiliently urging the block in the direction of said faced surface comprising a sheet metal spring disk overlying the block and forced thereagainst by screws around the edge of the disk.

5. A valve comprising a body having a finished flat working surface pierced by two spaced ports, a thin flexible metal disk positioned on said surface and apertured with ports to coincide with the ports of the body, a rigid metal block overlying said disk and provided with a cross-over port to connect the two body ports when turned to align therewith, a revolvable hub mounted on the valve body, means at the edge of said block and disk securing them to said hub for revolving therewith, and means resiliently forcing the block against said flexible disk.

6. A valve comprising a body having a finished flat working surface pierced by two spaced ports, a thin flexible metal disk positioned on said surface and apertured with ports to coincide with the ports of the body, a rigid metal block overlying said disk and provided with a cross-over port to connect the two body ports when turned to align therewith, a revolvable hub mounted on the valve body, a disk of thin spring metal overlying said block, means at the edges of said block, flexible metal disk and spring disk securing them to said hub for revolving therewith.

7. A valve comprising a body having a finished flat working surface pierced by two spaced ports, a thin flexible metal disk positioned on said surface and apertured with ports to coincide with the ports of the body, a rigid metal block overlying said disk and provided with a cross-over port to connect the two body ports when turned to align therewith, a revolvable hub mounted on the valve body, a disk of thin spring metal overlying said block, means at the edges of said block, flexible metal disk and spring disk securing them to said hub for revolving therewith, and a hollow shell-like handwheel secured to said hub enclosing said block and the metal disks.

8. A valve comprising a body having a finished flat working surface pierced by two spaced ports, a thin flexible metal disk positioned on said surface and apertured with ports to coincide with the ports of the body, a rigid metal block overlying said disk and provided with a cross-over port to connect the two body ports when turned to align therewith, a revolvable hub mounted on the valve body, a disk of thin spring metal overlying said block, means at the edges of said block, flexible metal disk and spring disk securing them to said hub for revolving therewith, and a hollow shell-like handwheel secured to said hub enclosing said block and the metal disks formed with a pointing device to indicate on and off position of the valve.

9. In a structure as specified in claim 5, said means resiliently forcing the block against said disk comprising a sheet metal spring overlying said block and secured at its edges to said hub.

10. In a structure as specified in claim 5, said means resiliently forcing the block against said disk comprising a sheet metal spring overlying said block and secured at its edges to said hub, and said hub threaded to said valve body whereby upon revolving the hub from on to off position of the valve the tension of said spring will be increased.

11. A valve comprising a valve body having a finished working surface pierced by a port and a revolvable valve block having a faced working surface positioned adjacent the working surface of said valve body provided with a recess adapted of said valve body provided with a recess adapted and arranged to be aligned over said port when the block is turned in one direction and to be moved out of alignment therewith when the block is turned in the opposite direction, means for turning said block in opposite directions and means arranged and adapted to resiliently urge the faced surface of the block in the direction of the working surface of the valve body with of progressively increased force when the block is turned to move the recess in the block out of alignment with the port in the valve body.

12. In a valve as defined in claim 11 plus means for limiting the turning of the valve block in opposite directions.

13. In a valve as defined in claim 11, a thin disk of hard resilient metal on said valve block positioned between the working surface of the valve body and faced surface of the valve block provided with an opening adapted to register over said recess in the block, said disk extending completely over the working surface of the valve block.

14. A valve body having a finished flat working surface pierced by two spaced ports, a faced block revolvably positioned adjacent said faced surface, said block being provided with a cross port arranged to be aligned over said spaced ports when the block is turned in one direction, a spring member arranged and adapted to resiliently urge the block in the direction of said faced surface, means for turning said block in opposite directions, said means being arranged and adapted to coact with said spring member for progressively increasing the resilient pressure of the spring member on the block upon the block being turned from an open position with the two spaced ports in alignment with the cross port to a closed position with said spaced ports out of alignment with the cross port.

15. A valve provided with a faced surface pierced by spaced ports, a faced block revolvably positioned adjacent said faced surface provided with a cross port arranged to be aligned at its opposite ends over said spaced ports when the block is turned, a disk of spring metal overlying said block adapted to engage the block at a point on the axis of revolution of said block and with its outer margin free of the block, and means at the outer margin of said disk arranged and adapted to support the disk against said block for resiliently urging the block in the direction of the faced surface of the valve, plus a thin resilient plate of hard metal positioned between the finished surfaces of said block and valve apertured to match the spaced ports and extending in an imperforate sheet completely across the opposed finished surfaces of said block and valve.

16. A valve provided with a faced surface pierced by a port, a faced block revolvably positioned adjacent said faced surface provided with a port arranged and adapted to be aligned over the port in the valve when the block is turned, an imperforate housing wholly enclosing said block secured thereto for turning therewith and separate means on the housing and valve respectively arranged and adapted to coact for directly securing the housing and valve together against separation while permitting rotation of the housing relative thereto for turning said block.

17. In a construction as defined in claim 16, said separate means comprising a thread on the valve body and a corresponding thread on the housing engaging therewith.

18. A valve provided with a faced surface pierced by a port, a faced block revolvably positioned adjacent said faced surface provided with a port arranged and adapted to be aligned over the port in the valve when the block is turned, a housing wholly enclosing said block and spaced therefrom at its sides, non-yieldable means arranged and adapted for revolvably securing the housing to the valve, means securing said block to said housing for revolving therewith upon turning the housing, a handle on the housing for turning said housing, and means yieldably urging said block in the direction of the faced surface of the valve.

OTTO W. HAHN.